(No Model.)
G. W. BENEDICT.
TELLURIAN.
No. 362,871. Patented May 10, 1887.
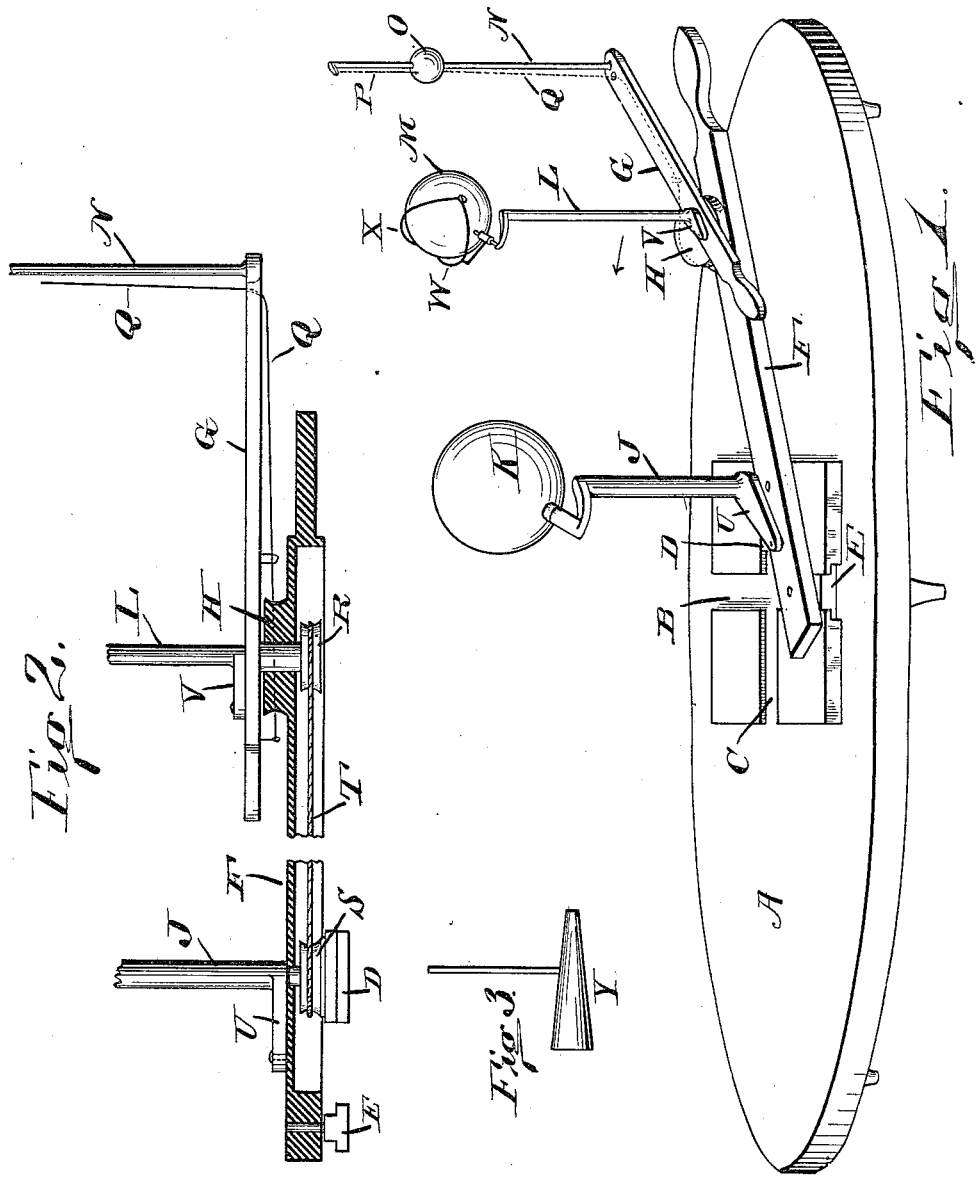
Witnesses:
W. A. Seward
W. E. Gardner
George W. Benedict Inventor
by James W. See Attorney

UNITED STATES PATENT OFFICE.

GEORGE W. BENEDICT, OF COLLEGE CORNER, INDIANA.

TELLURIAN.

SPECIFICATION forming part of Letters Patent No. 362,871, dated May 10, 1887.

Application filed January 17, 1887. Serial No. 224,539. (No model.)

*To all whom it may concern:*

Be it known that I, GEORGE W. BENEDICT, of College Corner, Union county, Indiana, (post-office being in another corner of the town, and known as College Corner, Butler county, Ohio,) have invented certain new and useful Improvements in Solar Globes, of which the following is a specification.

This invention pertains to instruments for astronomical demonstrations.

My improvements are applicable to tellurians, lunarians, and planetariums. It is of course understood that in all instruments of this class proper proportioning cannot be adhered to, it being necessary to ignore either proportion of volume of bodies or the proportion of distance between bodies, and in view of the fact that movements and the effect of movements of bodies constitute the most desired subject of demonstration, all accuracy of proportion either of volume or distance may be omitted.

My improved instrument is adapted in a superior degree to illustrate the motions and the effect of motions of the sun, earth, and moon.

My improvements will be readily understood from the following description, taken in connection with the accompanying drawings, in which—

Figure 1 is a perspective view of an instrument illustrating my improvement, and herein termed a "solar globe;" Fig. 2, a vertical longitudinal section of the main arm F of the instrument, with some of its connecting parts; and Fig. 3, an elevation of the shadow-cone, an accessory made use of in illustrating the eclipses.

In the drawings, A indicates an elliptic base or table whose surface is adapted to receive, near the margin, delineations of the zodiacal belt; B, a T-shaped slot arranged in the minor axis of the table; C, a similar slot arranged in the major axis of the table, the two slots crossing each other at the center of the table; D, a block fitted to slide longitudinally in the slot C; E, a similar block arranged to similarly slide in the slot B; F, the main arm of the instrument, the same lying parallel with the table and freely pivoted at its inner end to the two slide-blocks, and having its outer end projecting to or beyond the edge of the table, the arm being hollow underneath; G, a second arm, hereinafter termed the "moon-arm," lying above the main arm, and in a plane parallel therewith, and pivoted to the main arm; H, a circumferentially-grooved eccentric boss fixed upon the main arm, and encircling the pivot by which the moon-arm is connected to the main arm; J, a standard rising from the main arm at a point coinciding substantially with the axis of the pivot connecting the main arm with the slide-block D, this standard being hereinafter termed the "sun-standard;" K, the sun model, the same being a sphere freely journaled upon an inclined axis supported at the upper end of the sun-standard, the sun model being hereinafter spoken of as the sun; L, a standard rising from the main arm at a point coinciding substantially with the axis of the pivot connecting the moon-arm with the main arm, this standard being hereinafter spoken of as the "earth-standard;" M, the earth model, the same consisting of a sphere freely journaled upon an inclined axis supported at the upper end of the earth-standard, this model being hereinafter spoken of as the "earth;" N, a mast rising from the outer end of the moon-arm; O, the moon model, the same being a sphere fitted to slide vertically upon the mast, this model being hereinafter termed the "moon;" P, an elastic cord or analogous tensional spring reaching from the top of the mast to the moon, and serving by its retractile power to draw the moon upward upon the mast; Q, a cord attached to the moon and reaching downward therefrom and through a hole in the moon-arm at the foot of the mast, and passing thence longitudinally under the moon-arm, to and through a guide-staple in the moon-arm near the boss H, and thence partially around this boss, and thence to a point of attachment under the moon-arm; R, a pulley fixed upon the pivot of the moon-arm, this pulley being located within the hollow of the main arm, the pulley and moon-arm revolving together; S, a similar pulley secured to the slide-block D, concentric with the pivot which unites that block to the main arm, this pulley being a non-rotary one; T, a cord engaging these two pulleys, and adapted to perform after the manner of a belt as employed in transmitting rotary motions between parallel shafts; U, a short arm pivoted at one end of the main arm and supporting the sun-standard at its free end; V, a similar arm connecting the earth-standard to the moon-arm; W, a bow-shaped wire partially encircling the earth, and supported independent of the earth by a shank attached to the axis upon which the earth rotates, the shank being attached articulately to the earth axis, so as to be capable of rotation thereon, this wire being hereinafter termed the "ecliptic" wire; X, a bow-shaped wire having its extremities attached by hinged joints to the extremities of the ecliptic-wire, this wire forming, when turned into the plane of the ecliptic-wire, but upon the opposite side of the earth, a completion of the circle partially formed by the ecliptic-wire, the wire X being hereinafter termed the "horizon-wire," and Y an accessory, herein termed the "shadow-cone," the same consisting of a conical frustum provided with a radially-projecting handle, by which it may be manipulated, the angle of the sides of the cone being substantially such as correspond with focal lines tangent to the sun, and meeting at the nearest point to the sun on the earth's surface.

The outer end of the main arm may be swept entirely around the center of the table, and during the motion the arm rotates upon both the pivots by which the arm connects with the slide-blocks. If, while the main arm is in the position illustrated in Fig. 1, it be pushed in the direction indicated by the arrow, the arm will pivot upon the block D, which remains nearly stationary in its slot, the block E meanwhile being moved outwardly in its slot. The result is that the arc struck by the outer end of the main arm has a radius controlled in a superior degree by the distance from the outer end of the arm to its nearest block-pivot. As the motion of the arm continues, the block D begins to move inward in its slot, and the block E has its sliding motion greatly lessened until it becomes practically stationary, at which time the block D will have increased its sliding motion, the result being that the arc struck by the outer end of the main arm will have a radius governed in a superior degree by the distance from the outer end of the arm to the farther block-pivot. In other words, the two block-pivots alternate in becoming the most fixed pivot of oscillation for the main arm, and the duty of each block-pivot is assumed and surrendered accurately. The arc swept by the outer end of the main arm will consequently have a radius whose length changes from maximum to minimum, and again from minimum to maximum, twice during each complete sweep of the arm. The slot-block and pivot arrangement thus furnishes an elipsographic centering for the arm, and all portions of the arm beyond either pivot will describe ellipses. The earth being mounted near the outer end of the arm will consequently be carried around by the arm in an ellipse, and if the zodiacal belt be properly delineated upon the margin of the table the earth will move around vertically over the zodiacal belt, the sweep of the arm thus serving to illustrate the revolution of the earth around the sun in the zodiacal belt.

As the main arm is swept around the sun-standard, the sun will revolve in a small orbit, this serving to illustrate that motion of the sun around a point which is the common center of gravity of the sun and the planets revolving about it, the point always falling within the sun's volume. The sun-standard, being attached to the main arm by means of the arm U, can be adjusted with reference to the block-pivots so as to practically alter the dimensions of the sun's orbit. The sun may be revolved by the hand upon its inclined axis, and its rotation thus illustrated.

As the main arm is moved from the major toward the minor axis of the ellipse swept by it, the sun will obviously have a progressive motion toward the opposite major extremity of the table, and the instrument is thus adapted to illustrate the progressive movements of the sun through space in the direction of the constellation Hercules.

The earth may be rotated by the hand upon its inclined axis, thus illustrating the earth's daily motion, and such motion in conjunction with the revolution of the earth around the sun as the main arm is moved serves in illustrating the seasonal changes.

The ecliptic-wire W may be arranged in the plane of the ecliptic, and thus serve in illustrating the relation of surface localities to the plane of the ecliptic. The horizon-wire X may be turned to form the completion of the ecliptic-wire circle; or it may be turned into such position as to represent upon the earth's surface, as the earth rotates in its daily motion, a line corresponding with the tangential contact of the sunlight-rays with the earth, thus serving to illustrate the changes and gradations of light and darkness. The earth-standard and the sun-standard being connected with the main arm by means of the pivot-arms U and V, instead of being fixed thereon, permits of adjustments in distances to illustrate perihelion and aphelion, for which purpose either or both standards may be adjusted.

The pulley S being fixed, and the pulley R being rotary and attached to the moon-arm, and the earth-standard being attached to the moon-arm, it is obvious that as the moon is swept around its center the moon-arm will sweep the earth-standard as an axis, and that the earth will rotate upon the axis of its standard. Furthermore, the moon-arm may be swept around its axis while the main arm is held stationary, the slippage of the cord T upon its pulleys permitting such motion. The instruments serve, in this manner and regardless of the sun, to illustrate the revolution of the moon about the earth and the rotation of the moon upon its own axis during its revolution, and the consequent presentation of the same face to the earth at all times is illustrated.

The spring P tends to raise the moon upon its mast, and the cord Q tends to lower the moon upon its mast as the lower end of the cord is pulled upon. The cord Q, instead of reaching directly from one end of the moon-arm to the other, is deflected around a portion of the eccentric boss H, and the amount of this deflection of the cord will vary during the sweep of the moon-arm around the fixed eccentric boss, the result being that the boss will greatly increase the amount of the cord's deflection once during each complete sweep of the moon-arm. It follows that during each complete sweep of the moon-arm the moon will move up and down its mast a certain distance. This serves to illustrate the rising and falling of the moon or the inclination of the moon's orbit to the moon's axis.

By turning the moon-arm so as to place the moon properly between the earth and sun, and by holding the shadow-cone Y with its large end against the moon and its small end at the earth, I connect the earth and moon by a solid body, serving to illustrate very forcibly the nature of eclipses and the character of eclipses when viewed from points on the earth's surface at and away from the small end of the shadow-cone.

I claim as my invention—

1. A table provided with a pair of intersecting slots, a slide-block in each of said slots, an arm pivoted to each of said slide-blocks, an earth-standard and earth supported at the outer end of the arm, and a sun-standard and sun supported at the inner end of said arm, combined substantially as and for the purpose set forth.

2. An elliptic table, intersecting slots arranged in the major and minor axes thereof, a slide-block in each of the slots, an arm pivoted to both of said blocks, an earth-standard and earth at the outer end of said arm over the margin of the table, and a sun-standard and sun supported at the inner end of the arm, combined substantially as and for the purpose set forth.

3. A table provided with a pair of intersecting slots, a slide-block in each slot, a pulley fixed to one of the slide-blocks, an arm pivoted to both said slide-blocks, a sun-standard and sun supported at the inner end of said arm, an earth-standard journaled at the outer end of the arm, an earth supported by the earth-standard, a pulley secured to the journal upon which the earth-standard revolves in the said arm, and a belt engaging said two pulleys, combined and arranged to operate substantially as and for the purpose set forth.

4. A pivoted moon-arm, an eccentric located at the pivot of said arm and fixed in relation to said arm, a mast at the free end of said arm, a moon fitted to rise and fall on said mast, a spring arranged to elevate the moon upon the mast, and a cord attached to said moon and disposed longitudinally along the moon-arm, and deflected around said eccentric, combined substantially as and for the purpose set forth.

5. A table provided with a pair of intersecting slots, a slide-block in each of said slots, a main arm pivoted to both said slide-blocks, a sun supported at the inner end of said main arm, a moon-arm pivoted at the outer end of said moon-arm, a moon-mast and moon supported at the outer end of said moon-arm, and an earth-standard and earth supported at the pivoted axis of said moon-arm, combined substantially as and for the purpose set forth.

6. A table provided with a pair of intersecting slots, a slide-block in each of said slots, a pulley fixed to one of said slide-blocks, a main arm pivoted to both said slide-blocks, a moon-arm pivoted to the outer end of said moon-arm, a pulley secured to the pivot of said moon-arm, a belt engaging said pulleys, a mast and moon supported at the outer end of the moon-arm, an earth-standard and earth supported at the pivoted axis of the moon-arm, and a sun-standard and sun supported at the inner end of said main arm, combined substantially as and for the purpose set forth.

7. A pivoted main arm, a sun-standard and sun supported at the inner end of said arm, an earth-standard and earth supported at the outer end of said arm, and a pivoted arm, U or V, serving as the means for attaching said standards to their supports, combined substantially as and for the purpose set forth.

8. An earth axis, an earth fitted to rotate thereon, a bow-shaped ecliptic-wire supported by said axis and partially encircling the earth, and the bow-shaped horizon-wire hinged to said ecliptic-wire, combined substantially as and for the purpose set forth.

9. A sun, an earth, a moon, supports for them, and a conical frustum provided with a handle, combined and arranged for use, substantially as and for the purpose set forth.

GEORGE W. BENEDICT.

Witnesses:
 LAFE MOOR,
 JAMES SHULTZ.